United States Patent Office 2,765,196
Patented Oct. 2, 1956

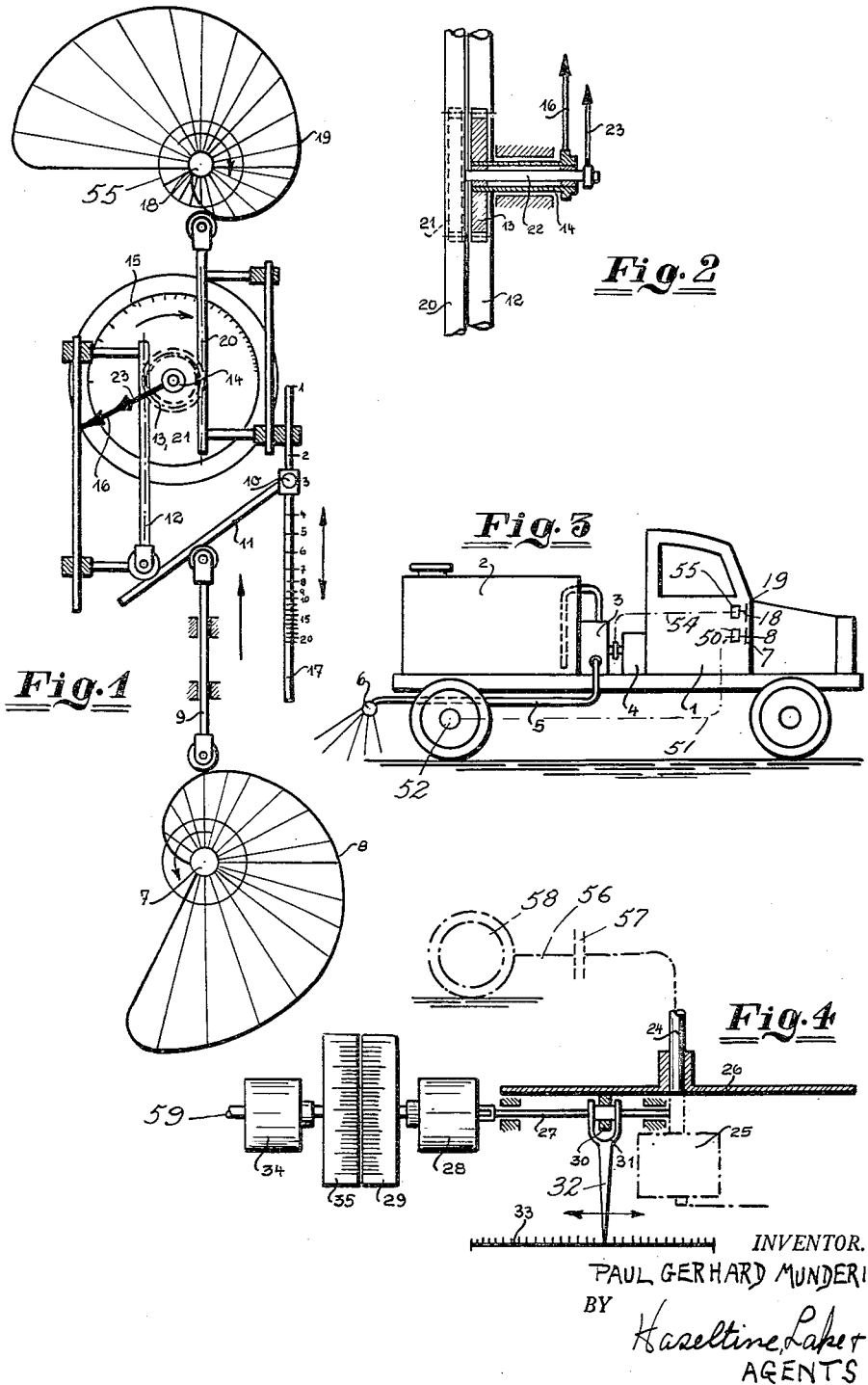

2,765,196

ARRANGEMENT ON MOTOR SPRAYING VEHICLES FOR THE OUTPUT OF BINDING AGENT

Paul Gerhard Munderich, Rothenbergen, Germany

Application March 23, 1953, Serial No. 344,027

Claims priority, application Germany March 22, 1952

2 Claims. (Cl. 299—34)

The present invention relates to a device on motor vehicles for applying a material to the road surface, and more particularly to a device for motor spray vehicles for applying a binder to sprayed road surfaces.

One of the most important conditions for the satisfactory condition of road surfacings in black construction is to adjust the amount of binder applied per unit area to the quantity necessary for each individual case. Since with hand-spraying apparatus, uniform application cannot be achieved, motor spray vehicles have been developed in the form of tank vehicles, the contents of the tank being applied to the road surface through a distribution pipe by means of a specially driven pump. In this case, pumps are used which are provided with their own drive and the pumps have a delivery which is linearly dependent upon the speed.

The quantity of binder necessary in each case is the product of the spray width of the vehicle, the desired loading of binder and the speed of the vehicle. The partial product of spray width and desired binder loading is constant for the individual working operation, so that the quantity to be delivered by the pump depends upon the speed of travel of the vehicle. The delivery capacity of the pump must therefore be adapted to the quantity delivered, resulting from the speed of the vehicle and the quantity of binder per unit of spray width. Since, however, the quantity of binder to be delivered varies for each spray width and in addition, according to the prevailing conditions, the quantity of binder to be applied per unit area is different, it has therefore been necessary to establish a multiplicity of individual diagrams, showing for the respective spray width, the quantity of binder per unit area as a function of the vehicle speed, as well as the required delivery capacity of the pump.

The invention relates to a device which gives, in a simple manner, an indication of the quantity to be delivered in unit time resulting from the spray width of the vehicle concerned, the vehicle speed and the quantity of binder per unit area, which can be adjusted to any desired quantity of binder per unit area and according to which the quantity delivered by the pump can then be regulated. According to the invention, the new device consists of two pointers moving over a scale, one of which is driven off the shaft of the pump or the speed indicator of the latter, and the other off the shaft of the vehicle speed indicator, with the interposition of an adjustable transmission gear for introducing the loading factor. The device may be constructed so that the shaft of the pump speed indicator actuates a rack by means of a cam, formed according to a logarithmic curve, said rack actuating the pointer indicating the quantity delivered by the pump in unit time, while the shaft of the vehicle speed indicator actuates a push-rod by means of a cam, formed according to a logarithmic curve, said push-rod operating a lever, which has its pivot adjustable along a rod and which then actuates a second rack driving the second pointer by means of a pinion. The two racks, the push-rod and the guide rod for the pivot of the intermediate lever are arranged parallel to each other.

One of the two pointers thus gives the quantity delivered by the pump in unit time, while the other pointer indicates the surface travelled over in unit time, taking into account the loading factor. It is therefore merely necessary for the driver to regulate the speed of the vehicle so that the two pointers indicate the same value, or coincide, if they are arranged concentrically. In this case, the quantity of binder applied per unit area corresponds to the loading factor provided by the adjustment of the intermediate lever. Due to the adjustability of the pivot, of the intermediate lever, said loading factor can be adjusted directly according to the particular requirements.

It is also possible, however, for the shaft of the speed indicator, by means of a friction disc carried by it, to drive a shaft situated radially of said disc by means of a roller adjustable on said shaft, so that the transmission ratio between the shaft of the speed indicator and the driven shaft is steplessly variable. The driven shaft then drives an ordinary tachometer, and such a tachometer is also connected to the pump. The two tachometers are then calibrated preferably according to litre output and the transmission roller is then adjusted according to the particular loading factor.

The present invention will now be more fully described in detail with reference to the accompanying drawings showing, by way of example, some embodiments of the present invention.

In the drawings:

Fig. 1 is a diagrammatic side elevation of an indicating mechanism according to the present invention;

Fig. 2 shows on an enlarged scale, a partial section of the device shown in Fig. 1;

Fig. 3 is a side elevation of a vehicle provided with a spraying device and having an indicating mechanism such as that shown in Figs. 1 and 2; and Fig. 4 is a side elevation, partly in section, of another embodiment of the indicating mechanism according to the present invention.

Referring now to the drawings, and first to Fig. 3 a motor vehicle 1 carries a tank 2 for the binder or material to be sprayed, the tank 2 being provided with heating means if required. A pump 3, having a delivery depending linearly upon the pump speed is driven by a separate motor 4, the pump 3 draws binder from said tank and forces the binder through a pipe-line 5 to a nozzle pipe 6 mounted at the rear of the vehicle. The nozzle pipe 6 has a definite length and is situated transversely to the direction of travel of the vehicle. The spray nozzles of the nozzle pipe 6 are distributed and dimensioned so that the binder issuing from the nozzles is distributed uniformly over the spray width of the nozzle pipe 6. To maintain a definite quantity of binder per unit area, therefore, the speed of the vehicle 1 must be adapted to the quantity delivered by the pump or the latter must be adapted to the speed of the vehicle. For this purpose, it would in itself be sufficient to adjust the motor 4 of the pump 3 according to the speed of travel of the vehicle. However, since the quantity of binder to be applied per unit area has frequently to be adapted to varying conditions, while the length of the spray pipe 6 generally remains unchanged, the indicating mechanism, shown in Fig. 1, in accordance with the invention, is built into the vehicle 1.

A first shaft 7 (Figs. 1 and 2) driven by the speed indicating gear 50 of a motor vehicle carries a cam 8, termed hereinafter the "first cam" with which is associated a rod 9 (termed hereinafter the "second rod"), axially movable by said cam. The speed indicating gear 50 is driven in a manner well known in the art by a flexible shaft 51 driven in turn by the axle 52 of the rear wheels. The rod 9 actuates a lever 11, which is pivoted on an adjustable pivot 10, the pivotal movement of said lever 11 being transmitted to a control rod 12 or rack (termed hereinafter the "other rack"). The control rod or other rack 12 meshes with a toothed wheel 13, on the spindle 14 of which wheel 13 (termed hereinafter "other pinion") there is mounted a first pointer 16 which is movable over a scale 15. The pivot 10 is adjustable along a rod 17. The rods 9, 12, 17 are arranged or slidably guided parallel to each other. The rod 17 is graduated according to a logarithmic scale of quantity of binder per unit area and the cam 8 is formed according to a corresponding logarithmic spiral. The pointer 16 can thus be given a deflection depending on the quantity of binder per unit area and the speed of the vehicle.

The pump 3 is coupled by a chain 53 with a shaft 54 driving a speed indicator 55 the shaft 18 of which, termed hereinafter the second shaft, carries a second cam 19, which is formed according to a logarithmic spiral of the speed. The cam 19 acts on a rack 20, slidable parallel to the rods 9, 12, 17, said rack 20 cooperating with a toothed wheel or pinion 21 mounted coaxially with the toothed wheel 13. The spindle 22 of said toothed wheel 21 passes through the spindle 14 and carries a second pointer 23.

The operation of this device is as follows:

For maintaining the required quantity of binder applied per unit area it is merely necessary after having adjusted the pivot 10 on the rod 17 to the quantity to be applied per unit area, to keep in coincidence the two pointers 16, 23, either by regulating the speed of the vehicle, or by regulating the driving motor 4 of the pump 3. Preferably the pump is regulated according to the speed of the vehicle, in which case it is possible to provide for the pump motor 4 an automatic control (not shown) which keeps the two pointers 16, 23 in coincidence.

In the embodiment according to Fig. 4, a friction disc 26 is mounted in front of a radial shaft 27 on a shaft 24 of the motor vehicle speed indicator 25.

The shaft 24 is connected to a flexible shaft 56, a reduction gear 57 being inserted, if desired. The shaft 56 is driven by the axle of one of the wheels 58. The shaft 27 drives a tachometer 28, which may be an eddy current instrument, the scale 29 of the tachometer 28 is calibrated as output in liters. Mounted on the shaft 27 for rotation and sliding thereon is a roller 30 bearing against the friction disc 26. The roller 30 is carried in the fork 31 of a pointer 32, which pointer can slide over a fixed scale 33. The scale 33 is graduated according to the basic loading, i. e. according to the quantity to be applied per unit area, taking into account the diameter of the roller 30. The tachometer 28 therefore, indicates the quantity of binder in liters to be applied per unit time, corresponding to the speed of travel of the vehicle. The pump shaft is connected to an eddy current speed indicating instrument 34 arranged on a shaft 59 corresponding to the shaft 18 shown in Figs. 1 and 2, the scale 35 of which is likewise calibrated in output in liters. Thus, the scale 29 indicates the intended liter output in unit time, while the scale 35 indicates the actual liter output of the pump.

It is thus merely necessary for the driver to regulate the speed of the vehicle or the pump drive so that the readings by one pointer (not shown) on the two scales 29, 35 agree.

I claim:

1. A device on motor spray vehicles for applying to the road surface a binder material in form of a spray, comprising, in combination, a spray pump having a drive independent of the vehicle drive, first and second means including indicator scale means and pointer means arranged for motion with respect to one another, means for measuring the speed of the vehicle, a first shaft forming part of said vehicle speed measuring means, said first means being driven from said first shaft so that said first means indicates the speed of the vehicle, a second shaft connected with said spray pump and driving said second means so that said second means indicates the output of said spray pump, and an adjustable transmission gear interposed between said vehicle speed measuring means and said first shaft for introducing the loading factor of the vehicle; said first and second means including a first and a second pointer, a first cam formed according to a logarithmic curve, said first cam being rigidly connected with said first shaft, a speed indicator connected to said spray pump, a second cam formed according to a logarithmic curve, said second cam being rigidly connected with said speed indicator, a rack actuated by said second cam, a pinion engaging said rack and actuating said second pointer indicating the output of said spray pump, a rod arranged parallel to said rack, a lever having a fulcrum adjustably arranged on said rod, another rack arranged parallel to said rack and said rod, said other rack being connected for operation to said lever, and another pinion driving said first pointer, said other pinion being in engagement with said other rack.

2. A device as claimed in claim 1, and a second rod connecting said first cam with said lever, said second rod being arranged for axial displacement parallel to said rack, said rod, and said other rack.

References Cited in the file of this patent

UNITED STATES PATENTS

| | | |
|---|---|---|
| 1,924,144 | Woodcock et al. | Aug. 29, 1933 |
| 2,159,319 | Cartwright | May 23, 1939 |
| 2,475,219 | Cartwright | July 5, 1949 |